G. W. GRAVES.
OVEN FOR GAS STOVES.
APPLICATION FILED MAY 28, 1915.
1,187,727.
Patented June 20, 1916.
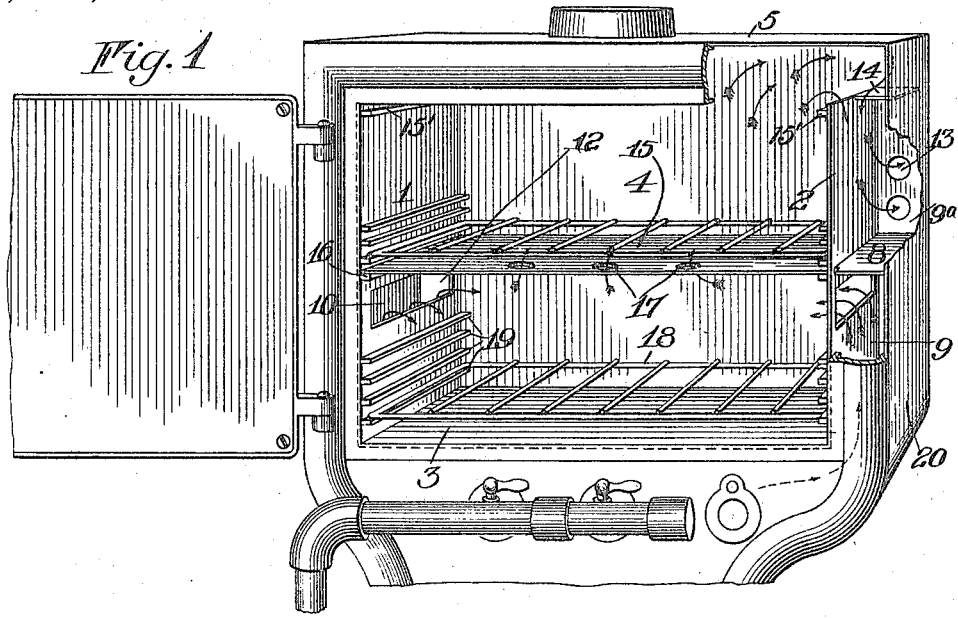
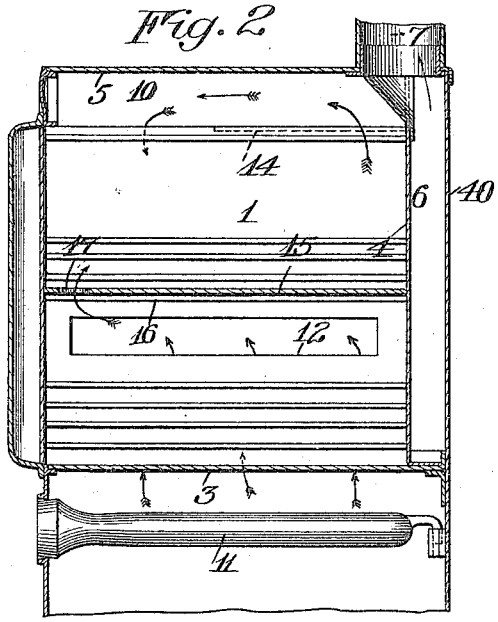
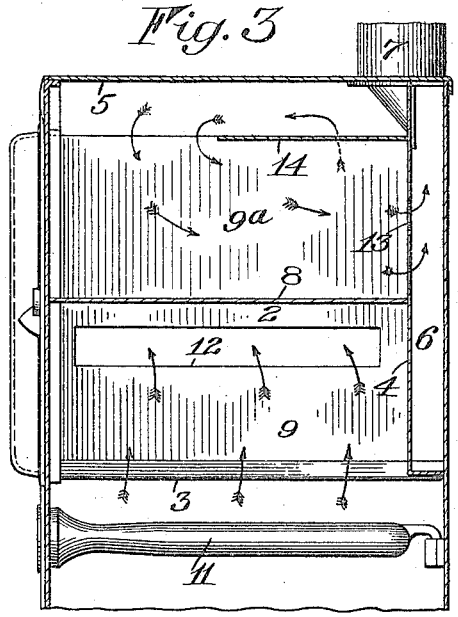
WITNESS
Walter B. Payne
INVENTOR
George W. Graves
BY
his ATTORNEYS

UNITED STATES PATENT OFFICE.

GEORGE W. GRAVES, OF CINCINNATI, OHIO, ASSIGNOR TO THE GRAVES SUPPLY CO., OF CINCINNATI, OHIO, A CORPORATION OF OHIO.

OVEN FOR GAS-STOVES.

1,187,727.  Specification of Letters Patent.  Patented June 20, 1916.

Application filed May 28, 1915. Serial No. 31,039.

*To all whom it may concern:*

Be it known that I, GEORGE W. GRAVES, of Cincinnati, in the county of Hamilton and State of Ohio, have invented certain new and useful Improvements in Ovens for Gas-Stoves; and I do hereby declare the following to be a full, clear, and exact description of the same, reference being had to the accompanying drawings, forming a part of this specification, and to the reference-numerals marked thereon.

My present invention relates to ovens and especially those intended for use in connection with gas stoves or ranges, or which are intended to be used for cooking purposes and heated directly by suitable gas burners, the arrangement of the parts being such that the size of the oven may be varied and made larger or smaller according to the size of the articles to be baked, the object of controlling the size of the oven being to reduce the volume of the gas consumed during the period the oven is maintained in the heated condition.

To these and other ends the invention consists in certain improvements and combinations of parts all as will be hereinafter more fully described, the novel features being pointed out in the claims at the end of the specification.

In the drawings: Figure 1 is a perspective view, portions thereof being broken away to show the flue construction; Fig. 2 is a central vertical sectional view, and Fig. 3 is a vertical sectional view taken through one of the side flues.

Similar reference numerals throughout the several views indicate the same parts.

In the construction of the baking oven employing my present invention, I have provided an oven in which the arrangement of the baking chamber may be altered without requiring the adjustment of dampers or employing other expedients for varying, or cutting down, the dimensions of the flues, these remaining and acting the same when the oven is reduced to one half of its maximum capacity as they do when the entire oven space is utilized.

In illustrating my present invention, I have shown an oven comprising the inner side walls 1 and 2 and a bottom wall 3, together with the rear wall 4. These several parts are inclosed in an outer casing formed by the side walls 10 and 20 which are spaced apart from the inner side walls 1 and 2 to form side flues. The oven is inclosed by a top wall 5 and a back wall 40 which is separated from the inner rear wall 4 to provide a rear flue 6 which discharges into the outlet pipe 7. The spaces between the two pairs of side walls are divided by horizontally disposed baffle plates, such as indicated by 8, which form at each side of the oven a lower up-draft flue 9 and an upper down-draft flue $9^a$. The heated products of combustion are supplied by one or more gas burners, of the usual or any preferred construction, indicated by 11, located beneath the oven bottom 3 from which the heated currents of air pass upwardly through the up-draft flues 9 and enter the lower portion of the oven chamber through apertures 12 formed in the lower portions of the side walls 1 and 2. The later terminate at their upper ends a short distance beneath the outer top wall 5, thus providing a space through which the air currents may pass, as indicated by the arrows, into the upper down-draft flue, suitable provision for their escape being provided near the lower portion of the down-draft flue, as shown by the apertures 13 opening into the back flue 6. In order to cause a complete circulation of the products of combustion and direct them into the forward portion of the top of the oven chamber, a baffle plate 14 is arranged as shown in Figs. 1 and 3, so as to close off the top of the rear portion of each of the down-draft flues $9^a$. This diverts the heated air currents, seeking egress through the apertures 13, from the rear of the oven chamber toward the front and top of the latter.

The size of the oven chamber is varied by means of an adjustable top plate 15 which normally occupies a position resting upon ways $15'$ at the upper ends of the inner side walls 1 and 2. In this position it forms a top flue which communicates at each end with the down-draft flues. The top plate is guided so that it may slide into and out of the position described and when it is desired to use an oven of smaller capacity, the plate 15 is withdrawn and is inserted in an intermediate position such as shown in Fig. 1 in which it divides the oven chamber into approximately one-half of its former cubical contents. When the top plate is lowered the entire space above it constitutes the top flue. In its lower position, the top plate is supported upon suitable guides or ways 16 on the side walls of the oven, and if desired, a plurality of such ways may be provided, although I have found in practice that a single adjustment fulfils all of the ordinary requirements in ovens intended particularly for domestic purposes. The top plate 15 is provided at its forward edge with a plurality of apertures indicated by 17 which afford egress for the heated gases at the front of the oven, irrespective of the adjustment of the top plate.

In the lower portion of the oven chamber, the usual rack 18 for supporting cooking vessels is provided which is adjustable to various elevations on guide rails 19 extending inwardly from the side walls 1 and 2.

By the arrangement of the walls and flues of the oven, it will be understood that the heated air currents passing upwardly from beneath the bottom 3 enter the oven chamber from the up-draft flues through the apertures 12, finally passing outwardly through the apertures 17 in the inner top wall 15, and escaping into the down-draft flues 9$^a$, thence through the apertures 13 into the rear flue 6, eventually escaping through the chimney pipe 7. By traversing this path the products of combustion heat the bottom and side walls, and the top and rear wall, in such a manner as to provide a substantial uniform temperature throughout the entire oven chamber irrespective of its size.

An especial advantage obtained by the construction of an oven in accordance with my present invention resides in the fact that when the oven top plate is adjusted, as shown in Fig. 1, the oven chamber is divided into two compartments in which different temperatures are maintained, so that articles of food to be baked quickly with a high temperature may be placed in the lower compartment, while other articles which should be treated at a lower temperature may be placed in the upper compartment and both articles cooked at the same time. This accomplishment is made possible by the above described flue construction which enables products of combustion that would otherwise be wasted to be fully utilized by compelling their circulation around the sides and rear of the oven chamber before passing into the outlet pipe.

I claim as my invention:

1. An oven with inner and outer side walls forming side flues, the inner walls having lower inlets and upper outlets and partitions dividing said flues into a lower updraft portion and an upper down-draft portion, the latter having outlets.

2. An oven comprising an exterior casing formed with inner and outer side walls separated to form flues, a top wall, a top plate carried by the inner side walls and spaced from the top wall of the casing to form a transverse flue connecting with the side flues, said inner side walls being each provided with a lower inlet and an upper outlet, said top plate having an air passage therein, and partitions closing the side flues between said inlets and outlets of the side walls, said side flues, also having outlets.

3. An oven comprising an exterior casing composed of a back, side walls and a top, two interior walls spaced from the side walls to form channels open at their lower ends and spaced from the top to form an upper outlet, and partitions dividing the channels substantially midway of their length into upper and lower portions each of said interior walls having a lower inlet and an upper outlet located respectively below and above each partition.

4. An oven constructed with inner and outer side walls separated to form side flues, each of the inner walls being provided with a lower inlet and an upper outlet, an oven bottom and an oven perforated top plate adjustable to different points of elevation in the oven relatively to the bottom and a partition in each side flue dividing it into a lower up-draft portion and an upper down-draft portion, the latter being provided with outlets.

GEORGE W. GRAVES.

Witnesses:
WILLIAM L. MERSFELDER,
NICHOLAS P. SCHINDLER.

Copies of this patent may be obtained for five cents each, by addressing the "Commissioner of Patents, Washington, D. C."